Jan. 15, 1963 T. S. DAIFOTES 3,073,409
AUTOMATIC STEERING MECHANISM FOR LAWNMOWERS AND THE LIKE
Filed Oct. 6, 1960 6 Sheets-Sheet 6

FIG-8

INVENTOR.
THEODORE S. DAIFOTES
BY
Lippincott, Ralls & Hendrickson
ATTORNEYS

United States Patent Office 3,073,409
Patented Jan. 15, 1963

3,073,409
AUTOMATIC STEERING MECHANISM FOR LAWNMOWERS AND THE LIKE
Theodore S. Daifotes, 1458 Wright Ave., Sunnyvale, Calif.
Filed Oct. 6, 1960, Ser. No. 60,988
9 Claims. (Cl. 180—6.2)

This invention relates to automatic steering mechanisms for self-propelled machines, particularly for controlling power lawnmowers and the like automatically to follow a ferromagnetic guide line laid on or in the ground.

A principal object of this invention is to provide a simple, reliable, and economical steering mechanism for self-propelled machines, e.g., lawnmowers, to cause such machines to follow a predetermined path.

According to this invention, the path to be followed is marked by a ferromagnetic guide line, e.g., a length of galvanized iron wire, which may simply be laid upon the ground along the path which is to be followed, or, if desired, may be buried up to about two inches below the surface of the ground. No electrical energization of the wire is required, and therefore there are no electrical insulation problems, power requirements, or safety precautions which need be taken in marking the path to be followed.

The automatic steering mechanism, which is attached to the lawnmower or other self-propelled machine, includes a magnet mounted for self-rotation toward the ferromagnetic guide line, and means responsive to such self-rotation of the magnet for turning the self-propelled machine toward the line.

The invention may be understood better from the following illustrative description and the accompanying drawings.

Figure 1:
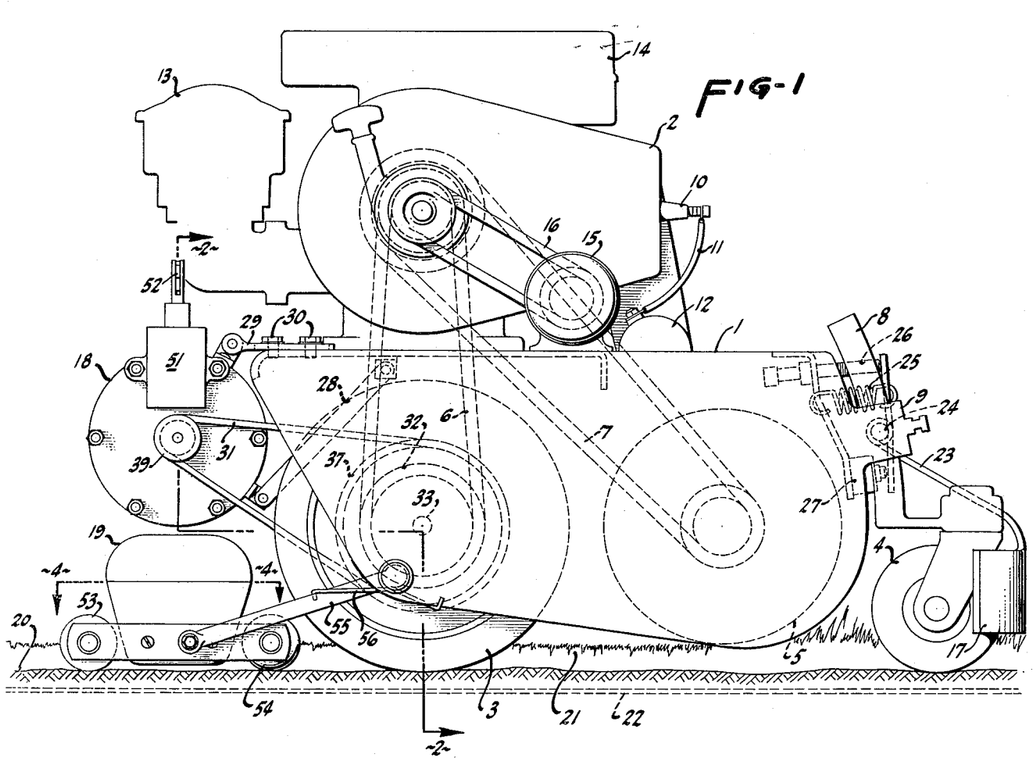
FIG. 1 of the drawings is a side elevation of a power lawnmower with automatic steering mechanism attached thereto.

The automatic steering mechanism to be described can be attached to a variety of power lawnmowers and other self-propelled machines. As illustrated in FIG. 1, it is attached to a conventional, commercially available power lawnmower comprising a body or frame 1, a gasoline engine 2, two rear driving wheels 3, two front caster wheels 4, and a cutting reel 5. The motor drives the rear wheels through a belt 6 and a differential, as will be more fully described hereinafter, and drives the reel through a belt 7. The height of the cutting reel above ground is adjusted by means of two brackets 8 and clamps 9 through which the two front caster wheels are attached to the frame. Ignition is accomplished by connection of the spark plug 10 through lead 11 to a high-voltage magneto 12 driven by the engine. The air filter is shown at 13 and the fuel tank at 14. A handle for manual steering and control would ordinarily be attached to the rear portion of the frame, but this is not essential when the mower is automatically steered, and the handle is not shown in the drawings.

The automatic steering mechanism, which has been added to the conventional lawnmower briefly described above, consists of a 28-volt D.C. generator 15 driven by the lawnmower engine through a belt 16, a bumper 17 attached to the front of the lawnmower, a hydraulic brake assembly 18 attached to the rear of the lawnmower, and a control assembly 19 also attached to the lawnmower. When attached to the rear, as shown, close to the driving wheels and behind the cutting reel, control assembly 19 interferes least with normal operation of the lawnmower; however, in some cases better control may be achieved by attaching the control assembly in front of the lawnmower.

Ground level is represented at 20, grass being cut is represented at 21, and a galvanized iron wire 22, buried just beneath the surface of the ground, serves as a ferromagnetic guide line to mark the path to be followed by the lawnmower.

The bumper 17 is supported by brackets 23, which are rotatively mounted upon a rod 24 extending horizontally across the front of the lawnmower frame. Spring 25 and stop pin 26 hold the bumper normally in the position shown. Small and light objects are swept aside by the bumper and thus out of the path of the lawnmower. Larger or heavier objects cause the bumper 17 to move backward slightly against the source of spring 25, and this opens an electrical switch 27 to stop the lawnmower, as is hereinafter more fully described.

The brake assembly 18 is attached to the frame by means of brackets 28 and 29. By loosening bolts 30, bracket 29 can be moved sufficiently to tighten the two belts 31 which connect the brake assembly to the two driving wheels 3.

Figure 2:
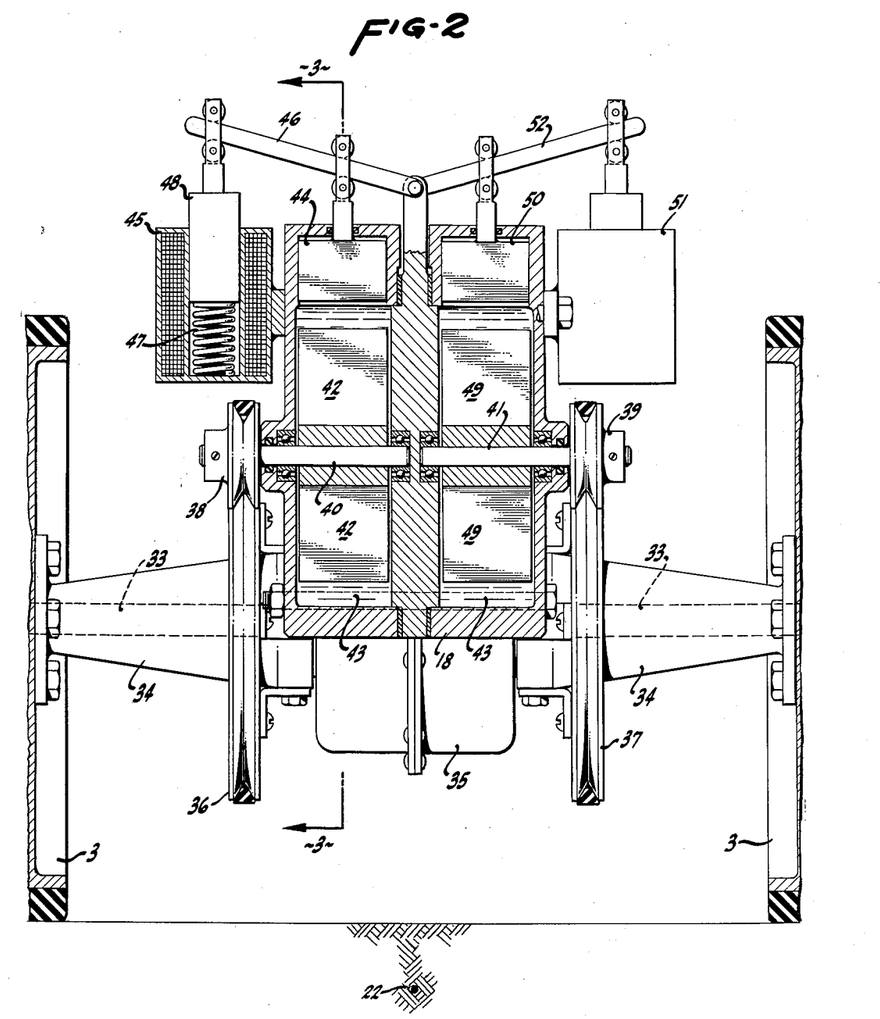
FIG. 2 is a section taken approximately along the line 2—2 of FIG. 1 and particularly showing a hydraulic brake assembly used to turn the lawnmower.

With particular reference to FIGS. 1 and 2, the belt 6 driven by engine 2 rotates a pulley 32 attached to the left-hand end (beyond the margin in FIG. 2) of an axle 33. The driving wheels 3 are mounted upon this shaft by means of bearings, and are not directly conected to the shaft. Instead, each wheel is connected to rotate with a hub assembly 34, and the two hub assemblies are driven by shaft 33 through a differential 35, whereby either wheel may turn faster than the other so that the lawnmower can be turned from side to side. The hub assemblies 34 are parts of the conventional, hand-steered lawnmower. The automatic steering mechanism comprises two pulleys 36 and 37 connected to the two hub assemblies so that these two pulleys rotate in unison with respective ones of the two wheels.

The brake assembly 18 comprises two smaller pulleys 38 and 39 fastened to the outer ends of two independently rotative shafts 40 and 41, respectively. Pulleys 38 and 39 are connected to pulleys 36 and 37 through two belts 31 (see FIG. 1) so that shaft 40 rotates at a speed proportional to the speed of the left-hand driving wheel while shaft 41 rotates at a speed proportional to the right-hand driving wheel.

Figure 3:
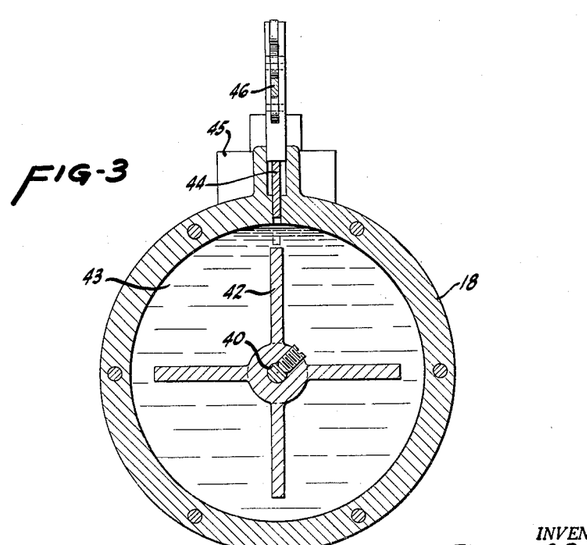
FIG. 3 is a section taken along the line 3—3 of FIG. 2.

Referring particularly to FIGS. 2 and 3, an impeller 42, which is attached to and rotates with shaft 40, comprises four evenly spaced, flat, radial vanes that move within and rotate a body of viscous liquid 43, e.g., mineral oil, filling the hollow interior of the substantially cylindrical housing of the brake assembly 18. Because there is a clearance of about ⅜ inch between the ends of the impeller vanes and the walls of the cylindrical housing, there is little viscous drag opposing rotation of the impeller so long as this clear space is unobstructed. However, there is considerable drag opposing rotation of the impeller when an obstruction is inserted into the clear space to inhibit free circulation of the viscous oil.

More particularly, there is provided a control vane 44, which may be lowered or raised, selectively, to increase or decrease the viscous drag that opposes rotation of the impeller 42 and thus opposes rotation of the left-hand drive wheel 3. The raising and lowering of vane 44 is accomplished by means of a solenoid 45 acting through a linkage 46. The solenoid 45 is biased by spring 47 to the raised position, illustrated in the drawings, in which the vane 44 is fully retracted and the viscous drag upon impeller 42 is a minimum.

When electric current is supplied to solenoid 45, as is hereinafter fully explained, the solenoid plunger 48 moves downward and lowers the control vane 44 an increasing amount as the current supplied to the solenoid increases, and thereby a greater viscous drag opposes the rotation of impeller 42 and the left-hand driving wheel 43. The close fit between plunger 48 and the cylindrical space in which it moves delays the escape of air trapped below the plunger, whereby the solenoid also acts as a dashpot to damp undesired oscillations.

Similarly, an impeller 49 having four radial vanes is attached to and rotates with shaft 41 at speed proportional to the speed of the right-hand driving wheel 3. The impeller 49 rotates within a separate hollow, cylindrical portion of the housing 18, also filled with the viscous oil 43. A control vane 50, operated by a solenoid 51 through a linkage 52, may be lowered into the clear space between impeller 49 and the wall of the hollow cylindrical housing. Thus, the viscous drag opposing rotation of impeller 49, and thus opposing rotation of the right-hand drive wheel 3, is variable under control of the electric current supplied to solenoid 51.

When the lawnmower is on course and directly over the ferromagnetic guide line 22, both of the control vanes 44 and 50 are fully retracted (in the upper positions illustrated in FIG. 2), and therefore the hydraulic brakes are essentially released with respect to both driving wheels 3. The differential transmits power to both wheels equally, and under these conditions, the lawnmower moves substantially straight ahead.

However, if the lawnmower veers to the left relative to the guide line 22, electric current is supplied to solenoid 51, as is more fully explained hereinafter, and this lowers vane 50 into the clear space between impeller 49 and the hollow cylindrical housing of the brake assembly. The increased viscous drag upon impeller 49 opposes rotation of the right-hand driving wheel, and thus causes the left-hand wheel 3 to rotate somewhat more rapidly than the right-hand wheel 3. Obviously, this will turn the lawnmower to the right and bring it back on course. Conversely, when the lawnmower veers to the right with respect to the ferromagnetic guide line 22, electric current is supplied to solenoid 45, and vane 44 is lowered to provide increased viscous drag opposing the rotation of impeller 42 and the left-hand driving wheel. This turns the lawnmower to the left and again brings it back on course.

As is best seen in FIG. 1, the control assembly 19 is contained within a separate housing made of non-magnetic metal, e.g., aluminum, which follows closely behind the lawnmower. It rests upon a pair of rollers 53 and 54, which support the bottom of the control assembly housing a short distance, preferably about ¼ inch, above the ground. The control assembly is attached to the lawnmower frame through a pair of links 55, which assure that the control assembly will follow the lawnmower in a constantly space and aligned relation to the lawnmower frame. Springs 56 urge the links 55 downward, and inhibit undue bouncing of the relatively light-weight control assembly.

Figure 4:
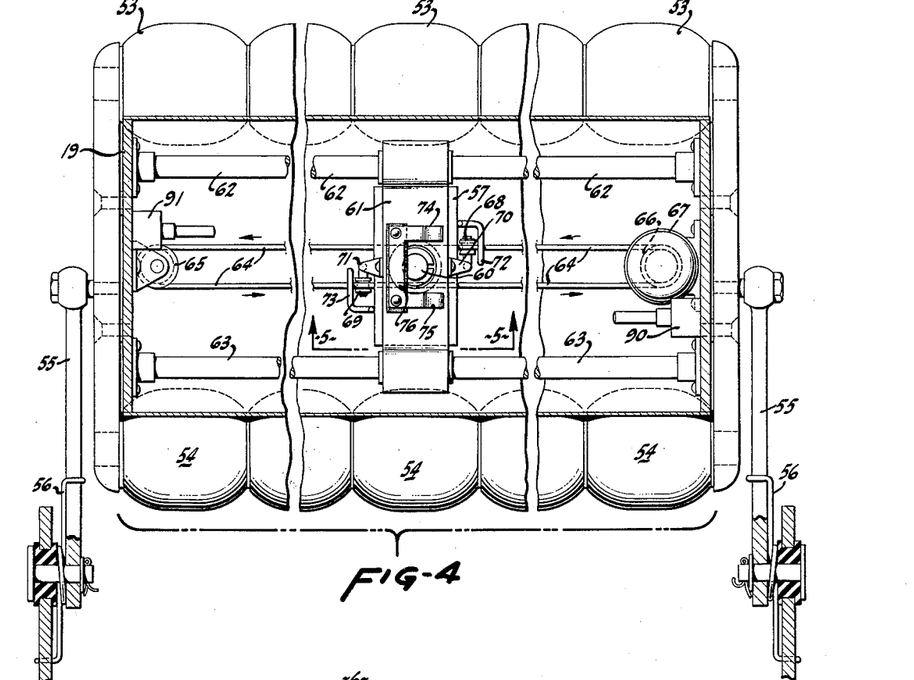
FIG. 4 is a fragmentary section taken along the line 4—4 of FIG. 1 and particularly showing a control assembly which controls the hydraulic brake assembly shown in FIG. 2, the section shown in FIG. 4 being broken and parts removed to reduce the width of the figure and to illustrate the center and two end parts more clearly and on a larger scale.
Figure 5:
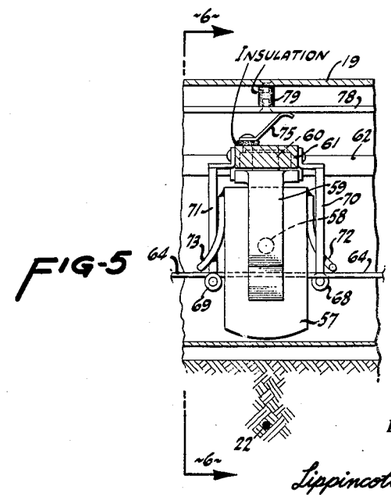
FIG. 5 is a fragmentary section taken along the line 5—5 of FIG. 4.
Figure 6:
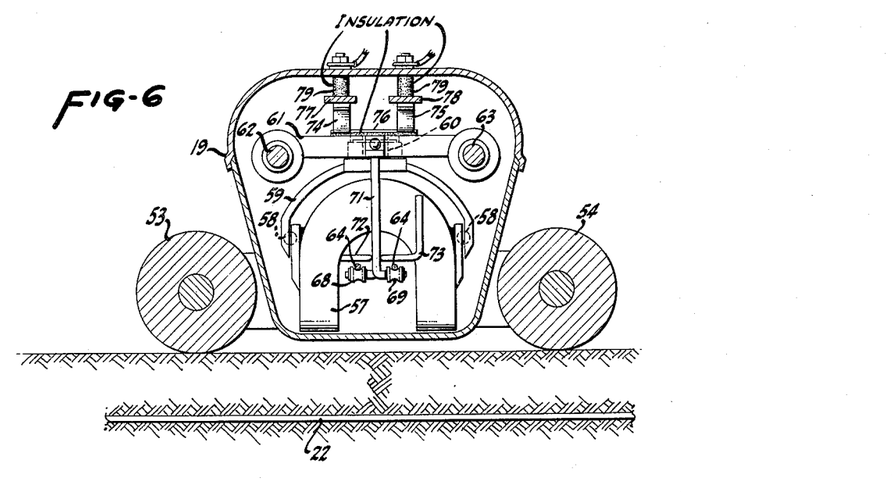
FIG. 6 is a section of the control assembly taken along the vertical plane indicated by line 6—6 of FIG. 5.

Referring particularly to FIGS. 4, 5, and 6, a U-shaped permanent magnet 57 is mounted within the control assembly housing with the two poles of the magnet facing downward. The permanent magnet is pivotably mounted upon a pair of ball bearings 58 supported at opposite ends of a fork 59, so that the magnet can rotate itself about a horizontal axis passing through the centers of the ball bearings 58, approximately through the center of gravity of the magnet 57, and extending approximately fore-and-aft with respect to the lawnmower. The ferromagnetic guide line 22 attracts the poles of magnet 57, and the magnet tends to tilt itself toward the wire 22. In other words, when the wire 22 is directly beneath the magnet, the magnet automatically aligns itself with its poles facing straight downward. However, if the wire 22 is to one side or the other of the magnet, the magnet rotates itself about the axis through bearings 58, and thus tilts so that its poles face somewhat toward the direction of wire 22.

Fork 59 is supported at its center by a bearing 60, which permits the fork 59 and magnet 57 to rotate slightly about a vertical axis passing through the center of the magnet. This permits the magnet more readily to follow turns in the path marked by wire 22. Bearing 60 is mounted on a movable carriage 61, which is slidably mounted (preferably through ball bushings) upon a pair of carriage tracks or traverse rods 62 and 63, which extend from side to side within the control assembly housing, so that the carriage 61 can move from one side to the other of the control assembly housing, carrying fork 59 and magnet 57 with it.

An endless belt 64 is arranged in a continuous, horizontal loop extending across the inside of the control assembly housing. Belt 64 is supported at one end by a pulley 65 and is supported at the other end by a wheel 66 continuously rotated by a small electric motor 67. Hence, as in FIG. 4, the upper side of the loop is in continuous motion toward the left, while the lower side of the loop is in continuous motion toward the right. The belt passes just above a pair of small idler rollers 68 and 69, which are mounted for frictional rotation at the ends of two supports 70 and 71 fastened to the magnet carriage 61. Two depressor bars 72 and 73 are fastened to opposite sides of the magnet 57, as shown, and normally extend just above opposite sides of the continuously moving belt 64.

When the magnet is directly over the wire 22, as illustrated in FIG. 5, the magnet poles face directly downward and the belt 64 passes freely beneath the lower ends of depressor bars 72 and 73, and freely over the friction rollers 68 and 69. Now, if the wire 22 should veer toward the left relative to the control assembly, the magnet will rotate itself about the ball bearings 58 so that its poles will face somewhat toward the left—that is, toward the wire 22. This tilting of the magnet 57 toward the left lowers depressor bar 72 into contact with that side of belt 64 which is in continuous motion toward the left, and in turn depresses the same side of belt 64 against the friction roller 68. Roller 68 can turn sufficiently to avoid jerking by sudden seizure of the belt, but its frictional mounting upon member 70 provides enough resistance that the belt 64 can drive the magnet carriage 61, and with it the magnet 57, toward the left within the control assembly housing. When the magnet is again directly over wire 22, it rotates itself about bearing 58 so that its poles face directly downward, whereupon both depressor bars clear the belt 64 and motion of the magnet carriage within the control assembly housing ceases.

Conversely, if wire 22 veers toward the right relative to the control assembly housing, the magnet automatically tips itself toward the right, and depressor bar 73 moves down against that side of belt 64 which is continuously moving toward the right, bringing this side of the belt into engagement with friction roller 69. As a consequence, the magnet carriage 61, and with it the magnet 57, are moved toward the right until the magnet is again directly over the wire 22. Thus, the magnet is automatically positioned within the control assembly to keep the magnet directly over the guide line.

Mounted on top of magnet carriage 61 are a pair of sliding electrical contacts or brushes 74 and 75, electrically connected together by a strap 76. The two brushes 74 and 75 are in a sliding contact with two horizontal bars 77 and 78. Bar 77 is a good conductor having little electrical resistance, e.g., a copper bar. Bar 78 is made of an electrically resistive material, e.g., any of the well-known alloys commonly used as electrical resistance elements. The resistor bar 78 has a resistance of about 75 ohms from its center to each of its ends. Each of the bars 77 and 78 is supported by a plurality of electrical insulators 79.

Figure 7:
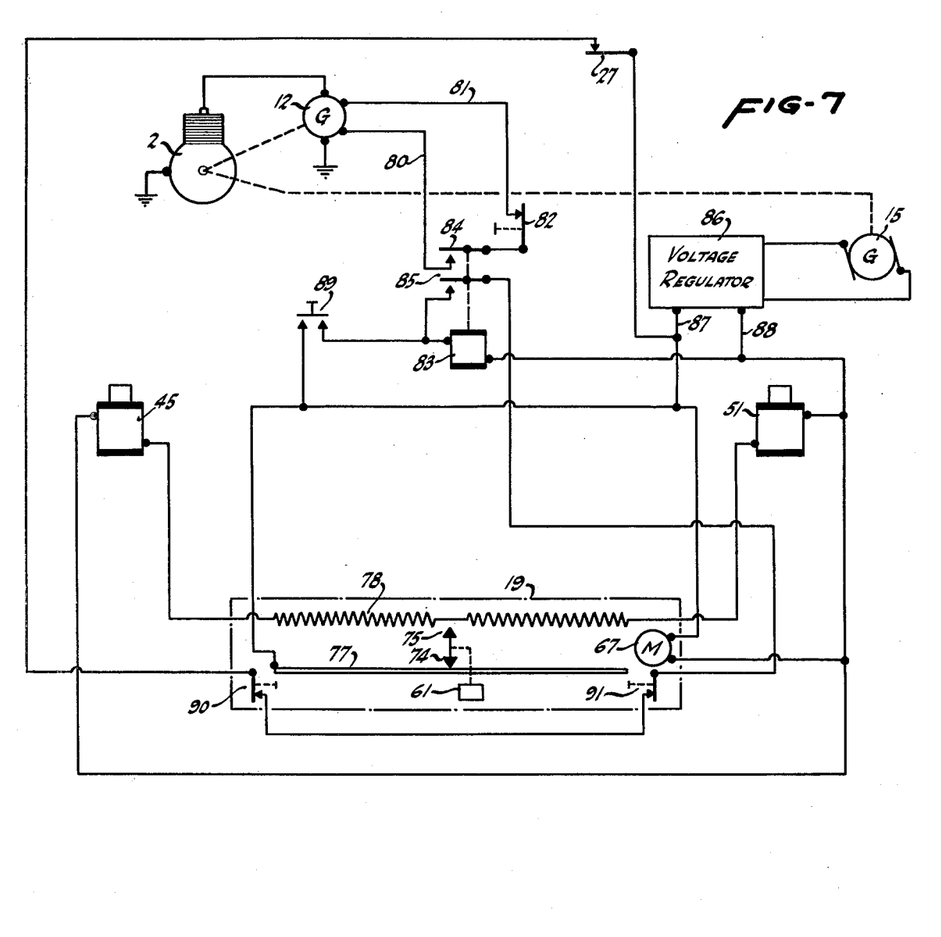
FIG. 7 is an electrical circuit diagram of the control system.

Referring now to FIG. 7, which is an electrical circuit diagram, the gasoline engine 2 drives magneto 12 and 28-volt D.C. generator 15, as hereinbefore explained. The magneto 12 is connected to the spark plug of the engine to form the ignition system, and is provided with control leads 80 and 81, which must be connected together for the magneto, and therefore the engine, to operate. In the conventional, manually steered lawnmower, the ignition switch 82 is provided to close the circuit between control leads 80 and 81 when the engine is to be operated, and to break this circuit when the engine is to be stopped. The automatic steering mechanism, added to the lawnmower according to this invention, comprises an additional relay 83 having a contact 84 in series with ignition switch 82, so that the engine can be operated only so long as relay 83 is energized, for reasons which will become apparent as the description proceeds. Relay 83 is also provided with a holding contact 85.

A voltage regulator 86 is preferably provided in association with the generator 15, so that a constant voltage of 28 volts D.C. will be provided between the lines 87 and 88. A starting push-button 89 connects relay 83 between lines 87 and 88 for initially energizing relay 83 when starting the engine 2. Thereafter, the relay is kept energized through its holding contact 85 in series with a plurality of normally closed switches hereinafter described.

Bar 77 is connected to the positive D.C. supply lead 87, and thereby 28 volts D.C. is supplied through contacts 74 and 75 to a point along the length of resistor bar 78 that depends upon the position of the magnet carriage 61 within the control assembly 19. Solenoids 45 and 51, which control the hydraulic brake assembly for turning the lawnmower, are connected between D.C. supply lead 88 and opposite ends of the resistor bar 78, as shown.

When the magnet carriage 61 is centered within the control assembly 19, indicating that the control assembly is centered directly over the guide wire 22, resistor bar 78 provides an electrical resistance of approximately 75 ohms in series with each of the solenoids 45 and 51, and neither solenoid receives sufficient electric current to depress the control vane that it operates by a significant amount. Hence, so long as the magnet carriage is approximately centered within the control assembly, neither of the solenoids 45 and 51 is substantially energized, both of the control vanes 44 and 50 (FIG. 2) remain in their upper or retracted positions, and the lawnmower travels straight ahead.

Whenever magnet carriage 61 moves to the right within the control assembly 19, indicating that the lawnmower is to the left of the desired path, the electrical resistance in series with solenoids 51 is reduced and a greater current flows to this solenoid. Responsive to this increased electric current, solenoid 51 lowers the control vane 50 of the hydraulic brake assembly and turns the lawnmower toward the right. Conversely, if the lawnmower gets too far to the right, magnet carriage 61 moves to the left within the control assembly, this reduces the electrical resistance in series with solenoid 45, and the increased current flowing to solenoid 45 causes this solenoid to lower control vane 44 of the hydraulic brake assembly and turn the lawnmower to the left.

If the magnet carriage 61 should move to the extreme right end or the extreme left end of the control assembly, it contacts and opens one or the other of two limit switches 90 and 91 (see FIG. 4 and FIG. 7). This breaks the circuit through holding contact 85 of relay 83, permitting this relay to become de-energized, whereupon the opening of relay contact 84 breaks the ignition control circuit of the magneto 12 and shuts off the engine 2. Thus, the lawnmower is automaticaly stopped whenever it becomes excessively off-course. Similarly, whenever the bumper 17 (FIG. 1) strikes an object too large or too heavy to be pushed aside readily, the switch 27 is opened. This also de-energizes the relay 83 and stops the engine 2.

Finally, it will be noted that motor 67 (see FIGS. 4 and 7) is connected directly between leads 87 and 88, and thus operates continuously while motor 2 and generator 15 are operating.

Figure 8:
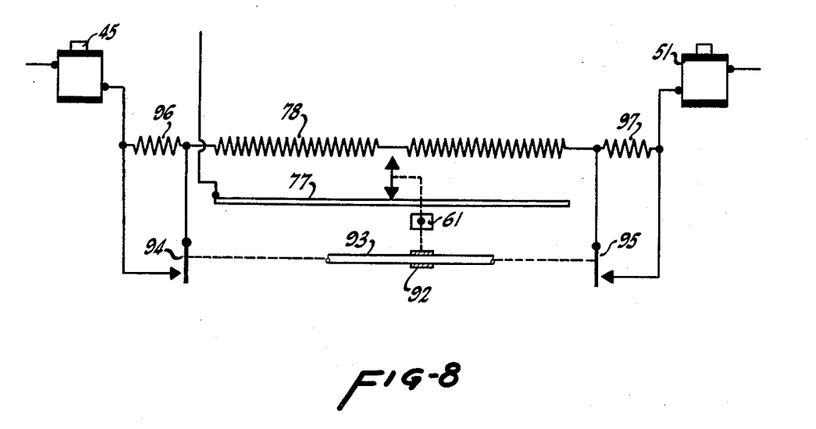
FIG. 8 is a fragmentary electrical circuit diagram showing a modification of the control system.

As hereinbefore described, the control action is essentially linear—i.e., the vehicle is turned at a rate proportional to the distance off-course. A disadvantage of this, particularly when the control assembly is attached behind the vehicle, is a tendency for the vehicle to cross the desired path repeatedly at a considerable angle to the desired heading. FIG. 8 is a fragmentary circuit diagram showing modification of the control system to add anticipatory control action which mitigates such tendency.

A member 92 mounted upon carriage 61 for movement therewith is in frictional engagement with a rod 93 extending from side to side within the control assembly. By way of example, member 92 may be a sleeve fitting around the rod 93 in sliding engagement therewith, so that the sleeve can readily slide along the length of rod 93 as the carriage 61 moves from left to right, or from right to left, but with enough friction that rod 93 is pushed slightly toward the left whenever carriage 61 moves toward the left and is pushed slightly toward the right whenever carriage 61 moves toward the right. The two ends of rod 93 operate two switches 94 and 95, so that switch 94 is closed and switch 95 opened whenever rod 93 is pushed toward the left, and switch 94 is opened and switch 95 is closed whenever rod 93 is pushed toward the right.

Two resistors 96 and 97 are connected between solenoids 45 and 51 and the two ends of resistor bar 78, as shown. Switch 94 is connected in parallel with resistor 96 for shorting out this resistor whenever switch 94 is closed. Similarly, switch 95 is connected in parallel with resistor 97 so that resistor 97 is shorted out whenever switch 95 is closed.

To understand the operation of this circuit, assume that the lawnmower has veered to the right relative to the ferromagnetic guide line, whereupon carriage 61 moves to the left within the control assembly housing, as hereinbefore explained. This moves the sliding contacts to the left along bars 77 and 78, and thus supplies increased electric current to solenoid 45 for turning the lawnmower to the left, as hereinbefore explained. At the same time, the leftward movement of carriage 61 and the member 92 mounted thereon, pushes rod 93 toward the left and closes switch 94. This shorts out resistor 96 and permits solenoid 45 to receive the full amount of control current permitted by the leftward movement of the contact brushes along bars 77 and 78.

The turning of the lawnmower changes its heading until the off-course distance begins to diminsh gradually. At this point, the carriage 61 begins to move back toward the center of the control assembly and member 92 mounted upon carriage 61, and moving therewith, pushes rod 93 toward the right, thereby opening switch 94. Immediately, resistor 96 is connected in series with solenoid 45 and reduces the current supplied to the solenoid. Thus, the rate of turning of the lawnmower is automatically reduced once the lawnmower is headed in a proper direction to correct the error in its position, before the lawnmower actually reaches the desired path on which the control assembly is centered over the guide line. This anticipatory control action insures that the lawnmower will cross the desired path at a smaller angle to the correct heading for following that path, and therefore will have a greatly reduced tendency to proceed far to the other side of the guide line. It will be noted that switch 95 is closed concurrently with the opening of switch 94, and therefore, upon carriage 61 moving past the center of the control assembly, the full control signal is promptly applied to solenoid 51 for turning the lawnmower toward the correct course.

This invention in its broader aspects is not limited to the specific example herein illustrated and described in detail. Numerous changes and modifications can be made without departing from the scope of the invention as defined in the following claims. What is claimed is:

1. Automatic steering mechanism for controlling a self-propelled machine to follow a ferromagnetic guide line, said steering mechanism comprising a magnet having downward facing poles, means supporting said magnet for self-rotation toward the ferromagnetic guide line about a substantially horizontal axis directed substantially fore-and-aft with respect to the self-propelled machine, means responsive to such self-rotation of the magnet for automatically moving said magnet and supporting means sidewise with respect to the self-propelled machine in a sense to bring the magnet directly over the ferromagnetic guide line, and means responsive in proportion to such sidewise displacement of the magnet and supporting means to the left or right for turning the self-propelled machine toward the left or right, respectively.

2. Automatic steering mechanism for controlling a self-propelled lawnmower to follow a ferromagnetic guide line laid on or in the ground, said steering mechanism comprising a magnet having a pair of downward facing poles, a carriage supporting said magnet for self-rotation toward the guide line about a substantially horizontal axis directed substantially fore-and-aft with respect to the lawnmower, carriage tracks supporting said carriage for movement sidewise with respect to the lawnmower, an endless moving belt, means supporting said belt in an elongated horizontal loop extending parallel to said carriage tracks, means for driving said belt to keep it in constant motion around said loop, so that opposite sides of said loop are in constant motion sidewise with respect to the lawnmower, a first pair of belt-engaging members attached to said magnet and carriage and arranged to grip the leftward moving side of said belt and to move the magnet and carriage toward the left responsive to self-rotation of said magnet toward the left, a second pair of belt-engaging members attached to said magnet and carriage and arranged to grip the rightward moving side of said belt and to move the magnet and carriage toward the right responsive to self-rotation of said magnet toward the right, and turning means responsive to such movement of the magnet and carriage toward the left or right for turning the self-propelled lawnmower toward the left or right, respectively.

3. Automatic steering mechanism as in claim 2, each pair of said belt-engaging members comprising a roller support attached to the carriage, a roller mounted for frictional rotation upon said support, and a bar attached to the magnet, the moving belt passing between said roller and said bar with sufficient clearance to move freely relative thereto so long as the poles of the magnet face straight downward, self-rotation of said magnet in one direction moving said bar toward said roller and decreasing said clearance and causing said bar to press the belt into frictional engagement with said roller, the frictional rotation of the roller supplying sidewise force to move the carriage.

4. Automatic steering mechanism as in claim 2, said turning means comprising a resistor bar of electrically resistive material extending parallel to the carriage tracks, an electrical brush mounted upon said carriage for movement therewith and in sliding electrical contact with said resistor bar, a voltage supply connected to said brush, a first solenoid connected between said supply and the left end of said resistor bar, so that movement of the magnet and carriage toward the left increases and movement toward the right decreases the electric current supplied to the first solenoid, a second solenoid connected between said supply and the right end of said resistor bar, so that movement of the magnet and carriage toward the right increases and movement toward the left decreases the electric current supplied to the second solenoid, and means controlled by said first and second solenoids for turning the lawnmower toward the left or right, respectively.

5. Automatic steering mechanism for controlling a self-propelled vehicle to follow a guide line, said vehicle having a left driving wheel and a right driving wheel connected to each other and to an engine through a differential, said steering mechanism comprising a first brake connected to the left driving wheel, a second brake connected to the right driving wheel, and control means including a position pick-off device movable responsive to the position of the vehicle relative to the guide line for delivering a current proportionate to the movement thereof, and electrically energized means operable in accordance with the amount of electric current delivered by said position pick-off device for actuating said first and second brakes selectively to turn the vehicle.

6. Automatic steering mechanism as in claim 5, said control means comprising a first solenoid connected to operate said first brake, a second solenoid connected to operate said second brake, a resistor bar extending sidewise relative to the self-propelled vehicle, a carriage mounted for movement parallel to said resistor bar, an electrical brush mounted upon said carriage for movement therewith and in sliding electrical contact with said resistor bar, a voltage supply, said brush being connected to said voltage supply, said first solenoid being connected between said supply and the left end of said resistor bar, and said second solenoid being connected between said supply and the right end of said resistor bar, so that movement of said carriage and brush toward the left energizes said first solenoid and applies said first brake to turn the vehicle toward the left, and movement of said carriage and brush toward the right energizes said second solenoid and applies said second brake to turn the vehicle toward the right, and means for automatically and continuously positioning said carriage over the guide line.

7. Automatic steering mechanism as in claim 5, each of said brakes connected to a driving wheel comprising a non-rotating, hollow, cylindrical housing, an impeller rotatively mounted within said housing, mechanical connections for rotating said impeller as the driving wheel rotates, a viscous liquid filling said housing, said impeller having a plurality of radial vanes that move within and rotate said liquid when the impeller rotates, there being a clear space between the ends of said vanes and said housing permitting such rotation with little viscous drag upon the impeller, and a control vane mounted for movement selectively into and out of said clear space, said control vane impeding the rotation of said liquid and increasing the viscous drag upon the impeller and braking the driving wheel as the control vane is moved into said clear space.

8. Automatic steering mechanism for controlling a self-propelled lawnmower to follow a ferromagnetic guide line laid on or in the ground, said lawnmower having a left driving wheel and a right driving wheel connected to each other and to an engine through a differential, said steering mechanism comprising first and second hollow, cylindrical, hydraulic brake housings non-rotatively mounted upon the lawnmower, first and second impellers rotatively mounted within said first and second housings respectively, belt-drive connecting means for rotating said first impeller as the left driving wheel rotates, belt-drive connecting means for rotating said second impeller as the right driving wheel rotates, a viscous liquid filling each of said housings, each of said impellers having a plurality of radial vanes that move within and rotate said liquid as the impeller rotates, there being clear spaces between the ends of said vanes and said housings, a first control vane movable selectively into and out of the clear space between the vanes of said first impeller and said first housing, a second control vane movable selectively into and out of the clear space between the vanes of said second impeller and said second housing, a first solenoid connected to move said first control vane into the clear space, a second solenoid connected to move said second control vane into the clear space, spring bias means for moving said control vanes out of said clear spaces when said solenoids are de-energized, a magnet having a pair of downward facing poles, a carriage supporting said magnet for self-rotation toward the guide line about a substantially horizontal axis directed substantially fore-and-aft with respect to the lawnmower, carriage tracks supporting said carriage for movement sidewise with respect to the lawnmower, an endless moving belt, means supporting said belt in an elongated loop parallel to said carriage tracks, means for driving said belt to keep it in constant motion around the elongated loop so that opposite sides of said loop are in constant motion in opposite directions sidewise with respect to the lawnmower, a first pair of belt-engaging members attached to said magnet and carriage and arranged to grip the leftward moving side of said belt and to move the magnet and carriage toward the left responsive to self-rotation of said magnet toward the left, a second pair of belt-engaging members attached to said magnet and carriage and arranged to grip the rightward moving side of said belt and to move the magnet and carriage toward the right responsive to self-rotation of said magnet toward the right, a resistor bar of electrically resistive material extending parallel to the carriage tracks, an electrical brush mounted upon said carriage for movement therewith and in sliding electrical contact with said resistor bar, and a voltage supply connected to said brush, said first solenoid being connected between said supply and the left end of said resistor bar so that movement of the magnet and carriage toward the left increases and movement toward the right decreases the electric current supplied to the first solenoid, increase in such current causing the solenoid to move the first control vane into the clear space of said first housing to brake the left driving wheel and turn the lawnmower to the left, said second solenoid being connected between said supply and the right end of said resistor bar so that movement of the magnet and carriage toward the right increases and movement toward the left decreases the electric current supplied to the second solenoid, increase in such current causing the second solenoid to move the second control vane into the clear space within the second housing to brake the right driving wheel and turn the lawnmower to the right.

9. Automatic steering mechanism for controlling a self-propelled machine to follow a ferromagnetic guide line, said steering mechanism comprising a magnet, means supporting said magnet for movement from a neutral position toward the ferromagnetic guide line, a position pick-off device for delivering an electric current proportionate to such movement, and electrically actuated means responsive in proportion to such current for turning the self-propelled machine.

References Cited in the file of this patent

UNITED STATES PATENTS

| | | |
|---|---|---|
| 2,321,874 | Tandler et al. | June 15, 1943 |
| 2,339,291 | Paulus | Jan. 18, 1944 |
| 2,690,626 | Gay et al. | Oct. 5, 1954 |
| 2,832,426 | Seargeant | Apr. 29, 1958 |
| 2,903,821 | Favre | Sept. 15, 1959 |

FOREIGN PATENTS

| | | |
|---|---|---|
| 22,401 | France | July 12, 1951 |
| | (1st add. of French Patent 495,128) | |